United States Patent
Lev

(10) Patent No.: US 8,223,486 B2
(45) Date of Patent: Jul. 17, 2012

(54) ELECTRONIC DEVICE RESTRAINT MECHANISM

(75) Inventor: Jeffrey A. Lev, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 489 days.

(21) Appl. No.: 12/598,251

(22) PCT Filed: Feb. 11, 2008

(86) PCT No.: PCT/US2008/053587
§ 371 (c)(1),
(2), (4) Date: Oct. 30, 2009

(87) PCT Pub. No.: WO2008/137196
PCT Pub. Date: Nov. 13, 2008

(65) Prior Publication Data
US 2010/0271761 A1  Oct. 28, 2010

Related U.S. Application Data
(60) Provisional application No. 60/916,557, filed on May 7, 2007.

(51) Int. Cl.
*H05K 5/00* (2006.01)
*H05K 7/00* (2006.01)
(52) U.S. Cl. ........... 361/679.57; 361/679.58; 312/223.2; 211/8; 211/9
(58) Field of Classification Search ............. 361/679.57, 361/679.58; 211/8, 9; 312/223.2
See application file for complete search history.

(56) References Cited

U.S. PATENT DOCUMENTS

| 6,034,869 | A | 3/2000 | Lin |
| 6,216,499 | B1* | 4/2001 | Ronberg et al. ................ 70/58 |
| 6,744,627 | B2 | 6/2004 | Won et al. |
| 6,763,690 | B2* | 7/2004 | Galant ............................ 70/58 |
| 6,796,536 | B1* | 9/2004 | Sevier, IV ..................... 248/121 |
| 7,007,912 | B1* | 3/2006 | Giuliani et al. ............... 248/552 |
| 2003/0128506 | A1 | 7/2003 | Won et al. |
| 2004/0075980 | A1 | 4/2004 | Park |
| 2006/0139875 | A1 | 6/2006 | Cheng et al. |

FOREIGN PATENT DOCUMENTS

EP  1612351  1/2006
KR  1019970002539  1/1997

(Continued)

OTHER PUBLICATIONS

Intellectual Property Office, Examination Report under Section 18(3), Appln No. 0919695.7, date of mailing Jun. 17, 2011, 3 p.

(Continued)

*Primary Examiner* — Anthony Haughton

(57) ABSTRACT

A docking station comprises a sliding member accessible to a user of the docking station and coupled to a post. The station also comprises a locking mechanism configured to couple to a lock and comprising a stop surface and an apparatus capable of physically restraining an electronic device to the docking station. When the locking mechanism and the lock are locked together, and when the sliding member is adjusted from an unlocked status to a locked status, the stop surface is fixed in a locked state, the stop surface thereby fixing the post in a locked position, the post thereby fixing the sliding member in the locked status. When the sliding member is fixed in the locked status, the apparatus physically restrains the electronic device to the docking station.

20 Claims, 8 Drawing Sheets

FOREIGN PATENT DOCUMENTS

KR   1020020005130   1/2002

OTHER PUBLICATIONS

International Search Report and Written Opinion, dated Jun. 27, 2008, pp. 10.

Translation of DE Office Action dated May 19, 2010, pp. 4.
DE Office Action, Appln No. 112008001203.2, dated Nov. 16, 2010, pp. 4.
Translation of DE Office Action, Appln No. 112008001203.2, dated Nov. 16, 2010, pp. 3.

* cited by examiner

ELECTRONIC DEVICE RESTRAINT MECHANISM

CROSS-REFERENCE TO A RELATED APPLICATION

The present application claims the benefit of, and incorporates by reference, provisional application Ser. No. 60/916,557, filed May 7, 2007, and entitled "Two-Stage Security Lock for Notebook Docking Station."

BACKGROUND

Portable devices, such as notebook computers, are susceptible to theft. Various locking mechanisms may be available by which such portable devices can be physically restrained to structures, such as docking stations, furniture, etc. Such restraint and locking mechanisms occupy space which is at a premium in portable devices.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. A "docking station" may broadly be defined as any apparatus to which a computer (e.g., a notebook computer or laptop computer) may couple. In some embodiments, a "docking station" may be defined as a base into which laptop/notebook computers may be plugged when at a fixed location. In some embodiments, a "docking station" may be defined as a receptacle for a portable computer that allows the computer to connect to accessories such as monitors and keyboards when used as a desktop computer. Other well-known definitions for "docking stations" also may be used.

DETAILED DESCRIPTION

Disclosed herein are various embodiments of a locking mechanism that can be used to physically restrain portable devices (e.g., notebook computers, docking stations) to immovable or difficult-to-move structures (e.g., furniture), thereby preventing theft of the portable devices. The disclosed embodiments are advantageous at least because of their conservative use of portable device real estate.

Figure 1:
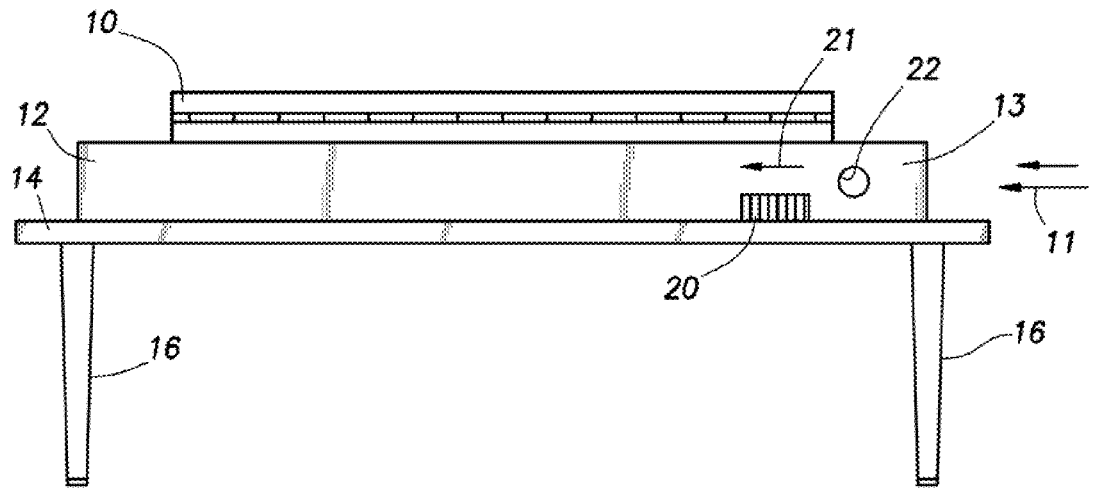
FIG. 1 shows an illustrative notebook computer resting on top of a docking station, in accordance with various embodiments.
Figure 2:
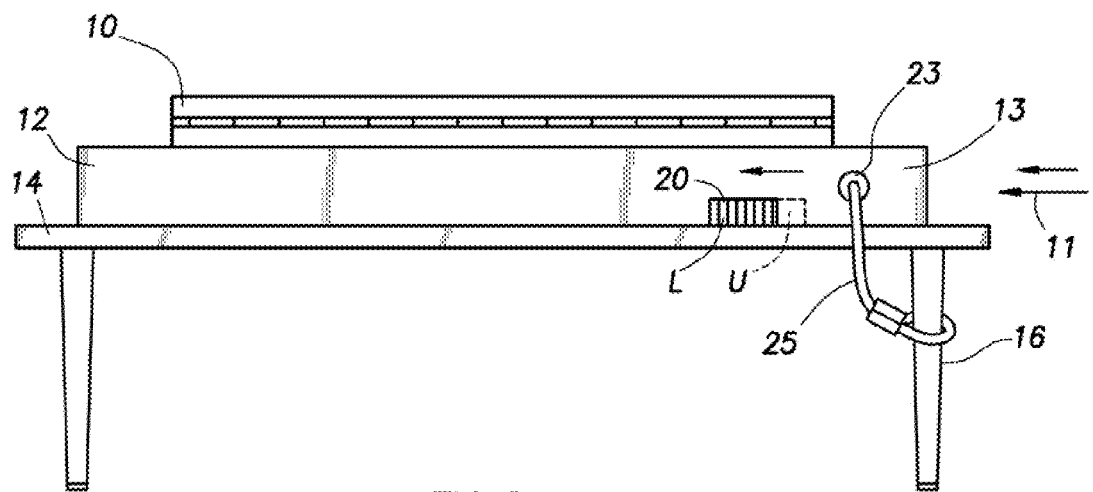
FIG. 2 shows the notebook computer of FIG. 1 in locking engagement with the docking station, in accordance with various embodiments.

FIGS. 1 and 2 show an illustrative notebook computer 10 resting on top of a docking station 12. In turn, the docking station 12 rests on top of a surface such as a table 14. The table 14 comprises one or more legs 16 or other structures by which the docking station may be restrained. In other embodiments, the docking station 12 may rest on top of other types of immovable or difficult-to-move objects, including desks, computer anchors, walls, various types of furniture, etc.

The docking station 12 comprises a sliding member 20. In some embodiments, the sliding member 20 comprises a switch having a user-accessible surface that protrudes beyond a surface 13 of the docking station 12. The sliding member 20 may be of any suitable shape (e.g., a rectangular prism) and size (e.g., between 0.5 cm and 3 cm in length, between 0.25 cm and 2 cm in height and between 0.25 cm and 6 cm in depth). The sliding member 20 can be slid in the direction of arrow 21 from an unlocked position (U) to a locked position (L). When the sliding member 20 is in the locked position, the notebook computer 10 is locked to the docking station and cannot be removed without damaging the computer and docking station. In accordance with various embodiments, the sliding member 20 is maintained in the locked position L by action of a docking station lock 23, shown in FIG. 2. The lock 23 is inserted into slot 22 and turned, for example, with a key. The lock 23 couples to a cable 25 which, in turn, couples to any suitable, immovable (or difficult-to-move) object, such as leg 16 of the table 14. In this way, the lock 23 locks the docking station 12 to the table 14 and also prevents the sliding member 20 from returning to the unlocked position U. By maintaining the sliding member 20 in the locked position L, the notebook computer 10 is locked to the docking station. One lock (23) thereby performs two locking functions: the locking of the notebook computer 10 to the docking station 12, and the locking of the docking station 12 to the table 14.

Figure 3:
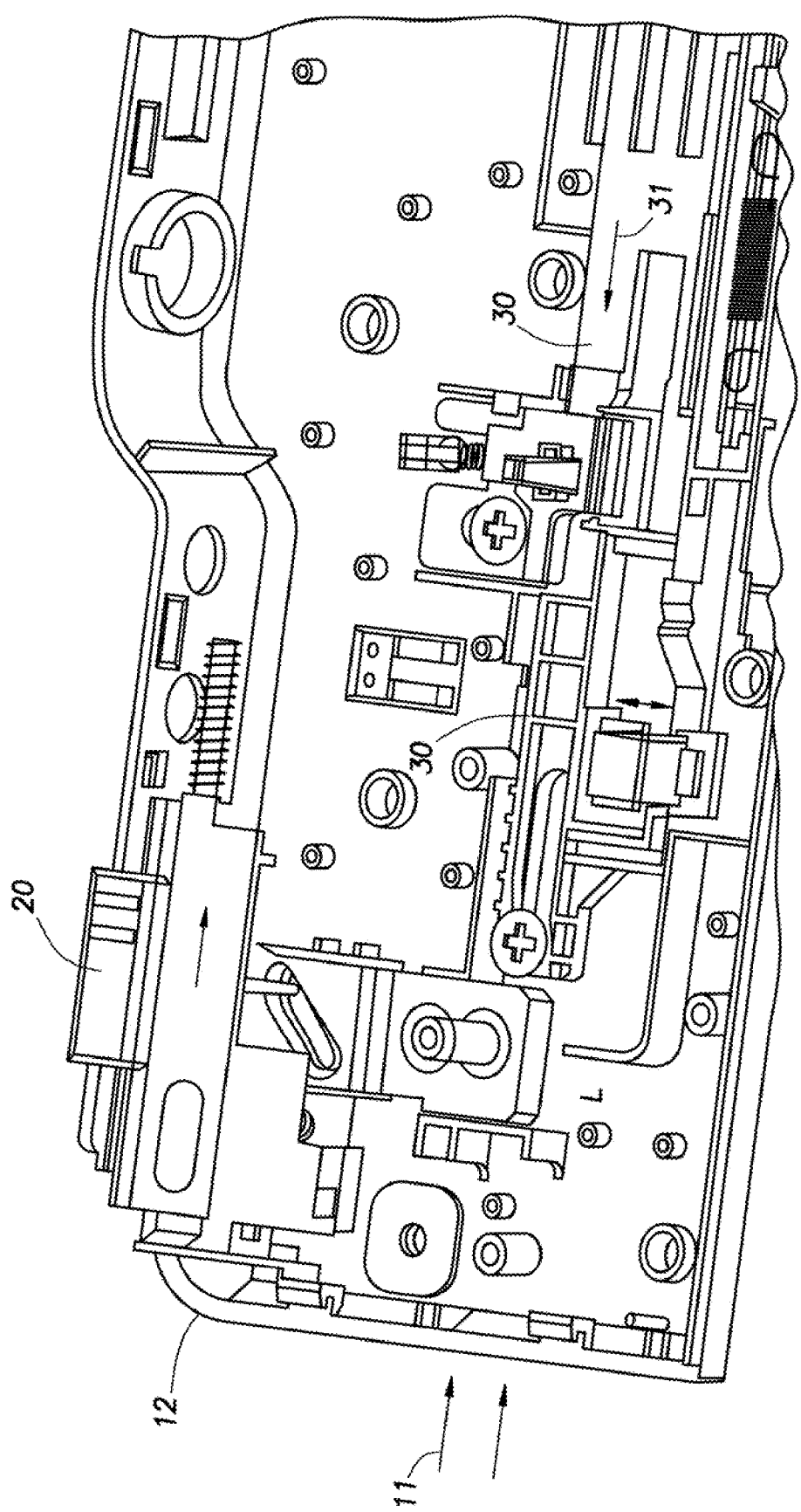
FIG. 3 shows an illustrative embodiment of a portion of the docking station, in accordance with various embodiments.

FIG. 3 shows an interior view of a portion of the docking station 12. The view in FIG. 3 is oriented as indicated by arrows 11 in FIGS. 1-3. The sliding member 20 is shown in the upper left-hand portion of the figure. An ejector bar 30 is also shown. As described in detail below, the ejector bar 30 slides to the left (i.e., in the direction of arrow 31) to cause the notebook computer 10 (not specifically shown in FIG. 3) to be ejected (e.g., pushed away) from the docking station 12.

Figure 4:
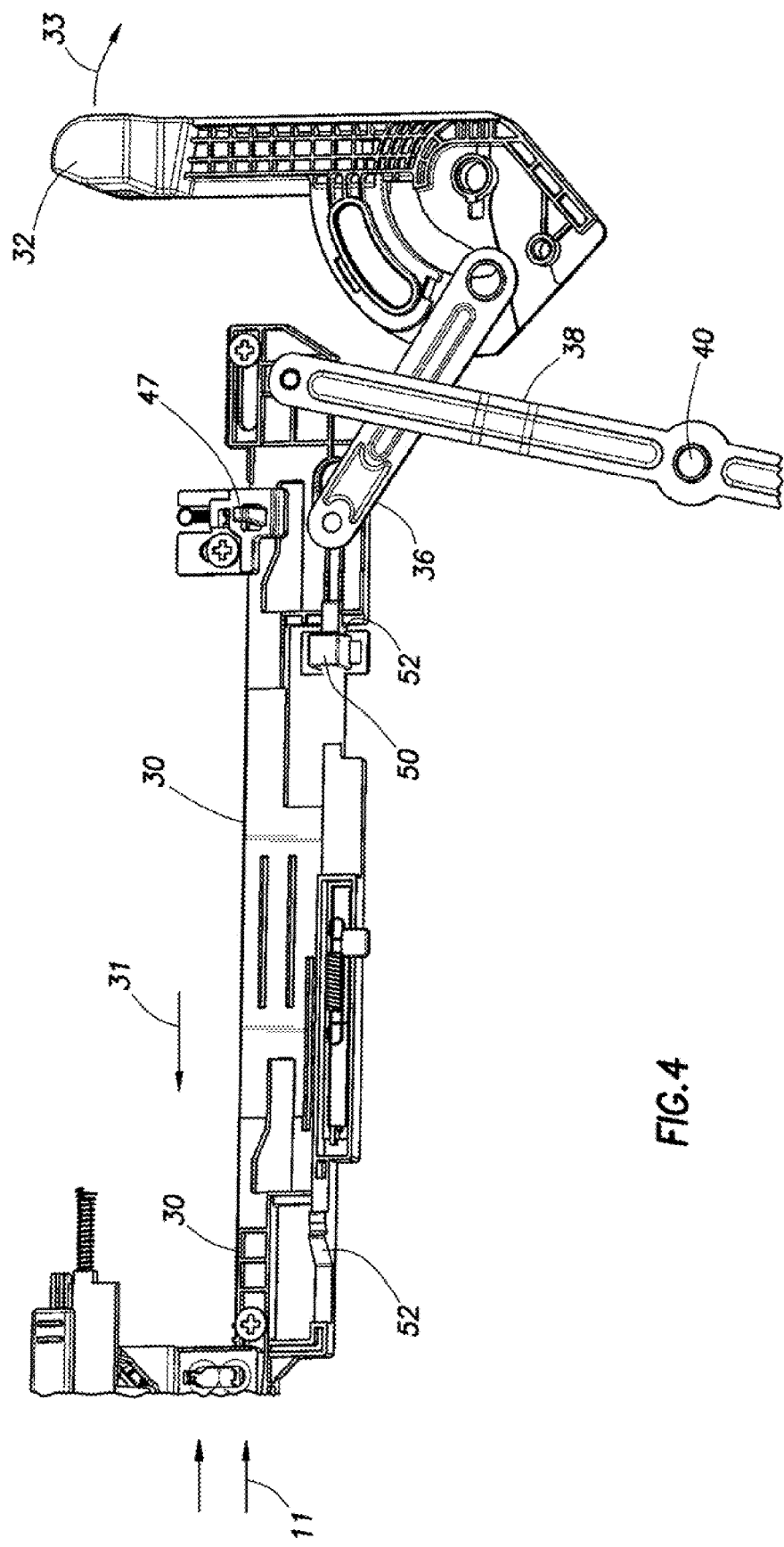
FIG. 4 shows an illustrative ejector mechanism, in accordance with various embodiments.

FIG. 4 shows another view of the ejector bar 30. The ejector bar 30 is caused to slide to the left (i.e., in the direction of arrow 31) by an end-user forcing ejector push member 32 to the right (in the direction of arrow 33). The ejector bar 30 and ejector push member 32 couple together by member 36. Member 38 couples to ejector bar 30 and to another ejector bar not shown in FIG. 4. Member 38 pivots about pivot point 40. When ejector push member 32 is pushed in the direction of arrow 33, the ejector bar 30 is forced to move in the direction of arrow 31. The ejector bar 30 comprises one or more hooks 47 that catch a bottom surface of the notebook computer 12 (e.g., using one or more corresponding orifices on the bottom surface of the notebook computer 12). The ejector bar 30 also comprises one or more plungers 50. As the ejector bar 30 is moved in the direction of the arrow 31, the hooks 47 pull back slightly to release from the notebook computer 12. As the ejector bar 30 is forced further in the direction of the arrow 31, the plungers 50 are forced upward by ramps 52 (no plunger is shown at the left-most plunger ramp 52). The upward force of the plungers pushes against the notebook computer 12, thereby separating the notebook computer 12 from the docking station.

Figure 5:
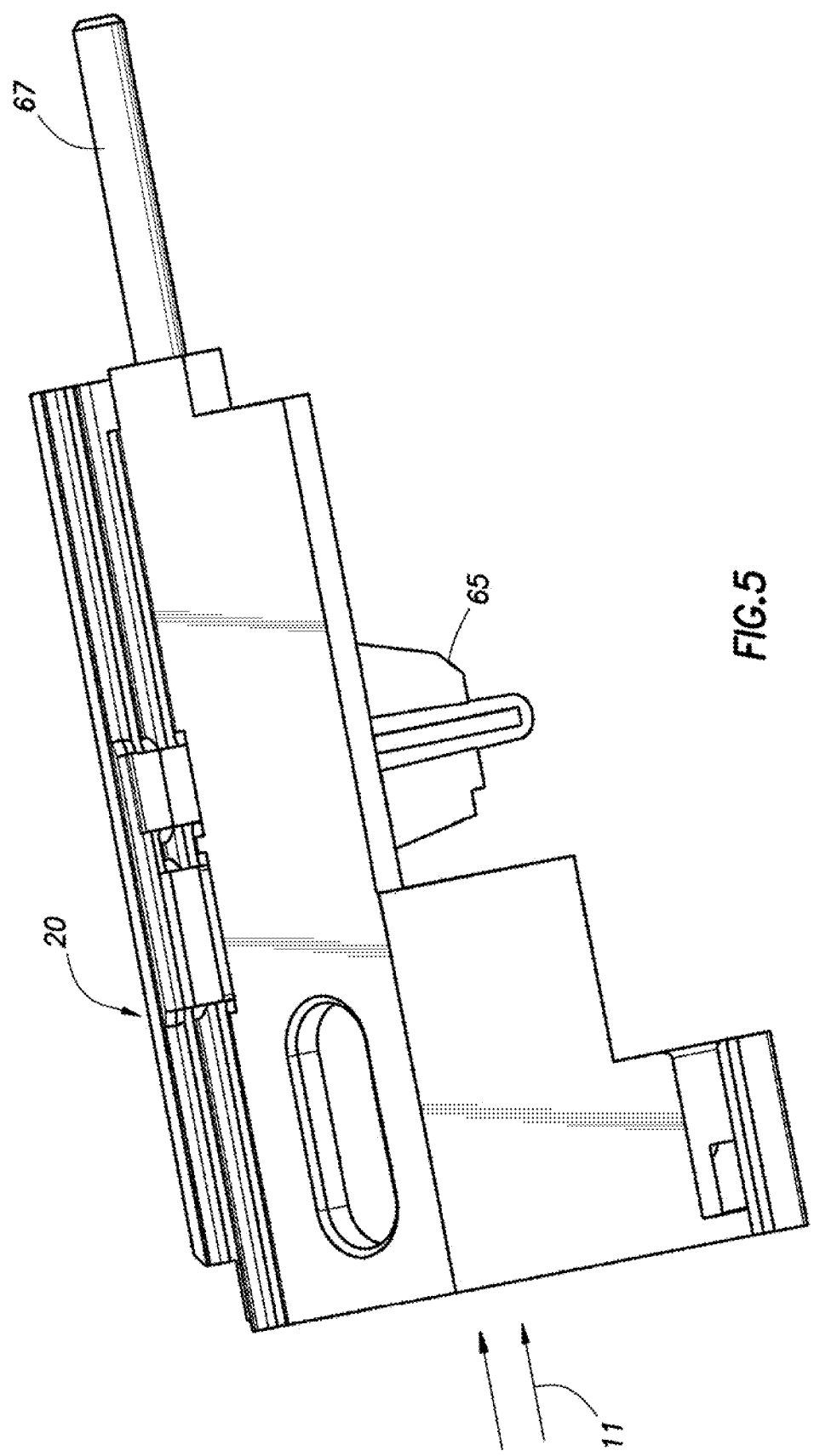
FIGS. 5 and 6 show different views of an illustrative sliding member, in accordance with various embodiments.
Figure 6:
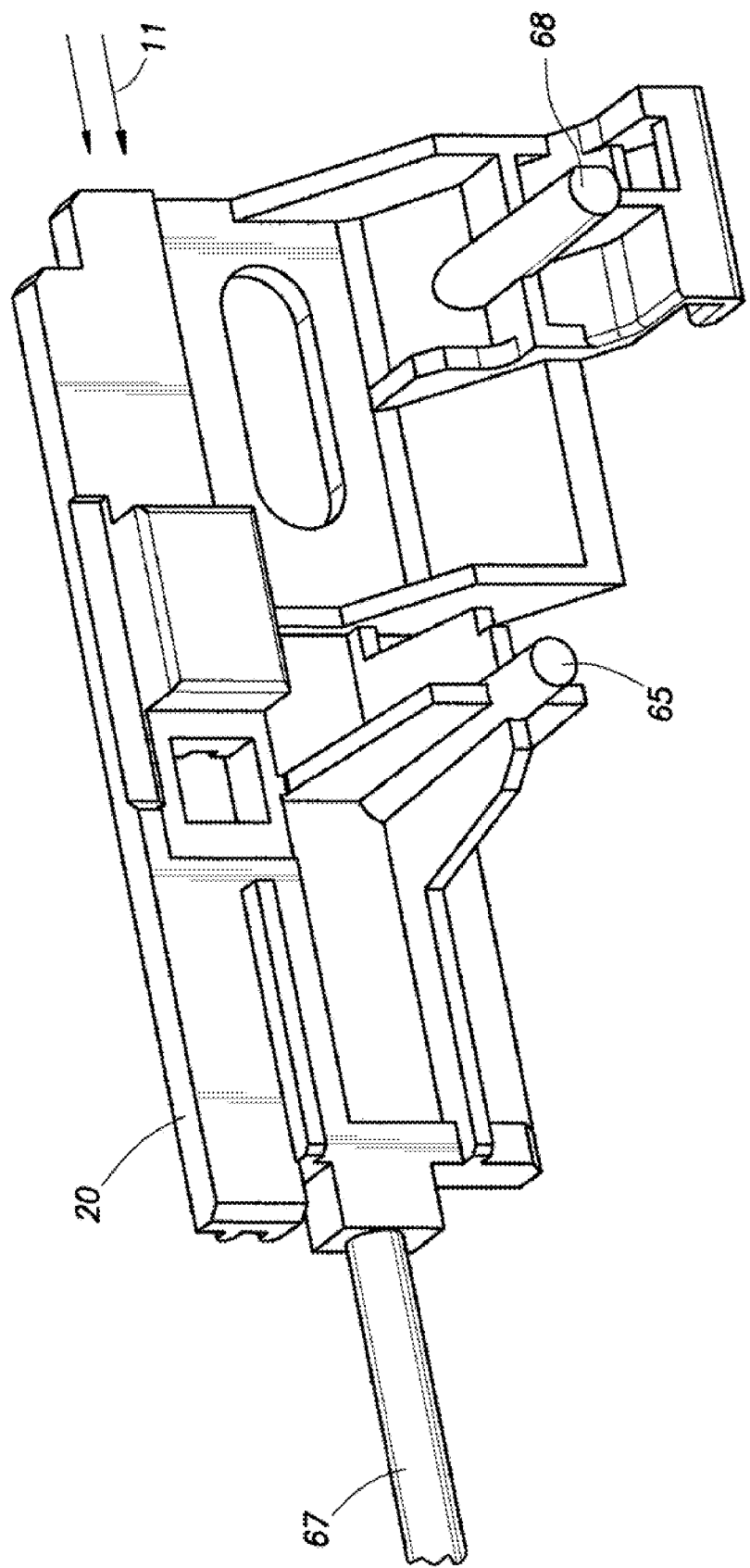

FIGS. 5 and 6 show top and bottom views, respectively, of the sliding member 20. The sliding member 20 comprises a transverse post 67 and a pair of vertical posts 65 and 68 protruding downward from the bottom of the sliding member 20. The transverse post 67 and vertical posts 65 and 68 may be of any suitable shape (e.g., cylindrical) and size (e.g., with radii between 1 mm and 5 mm and lengths between 5 mm and 40 mm).

Figure 7:
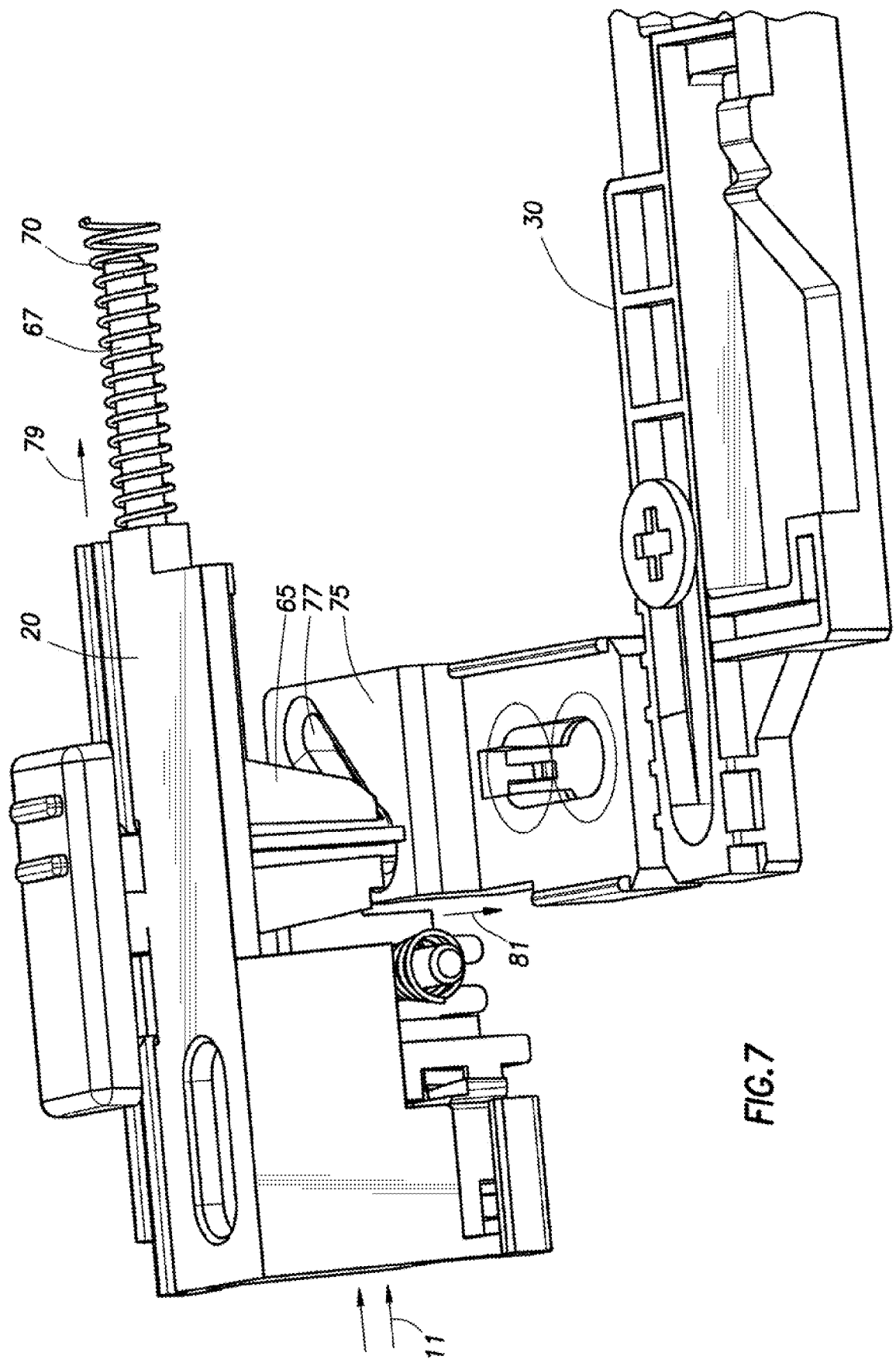
FIGS. 7 and 8 show an illustrative locking mechanism in an unlocked position, in accordance with various embodiments.

FIG. 7 illustrates the sliding member 20 engaging a locking bracket 75. The locking bracket 75 comprises an angled cam groove 77 in which the bottom end of the post 65 resides. As the sliding member 20 is slid to the right (in the direction of arrow 79), the rightward motion of post 65 in angled cam groove 77 forces the locking bracket 75 in an orthogonal direction, as indicated by arrow 81. A spring 70 is disposed on transverse post 67 to apply pressure in the direction opposite the direction identified by arrow 79. Spring 70 causes the sliding member 20 to naturally reside in the unlocked position U. The angled cam groove 77, in some embodiments, is of an oval shape, has a length of between 4 mm and 20 mm and a depth of between 2 mm and 8 mm.

Figure 8:
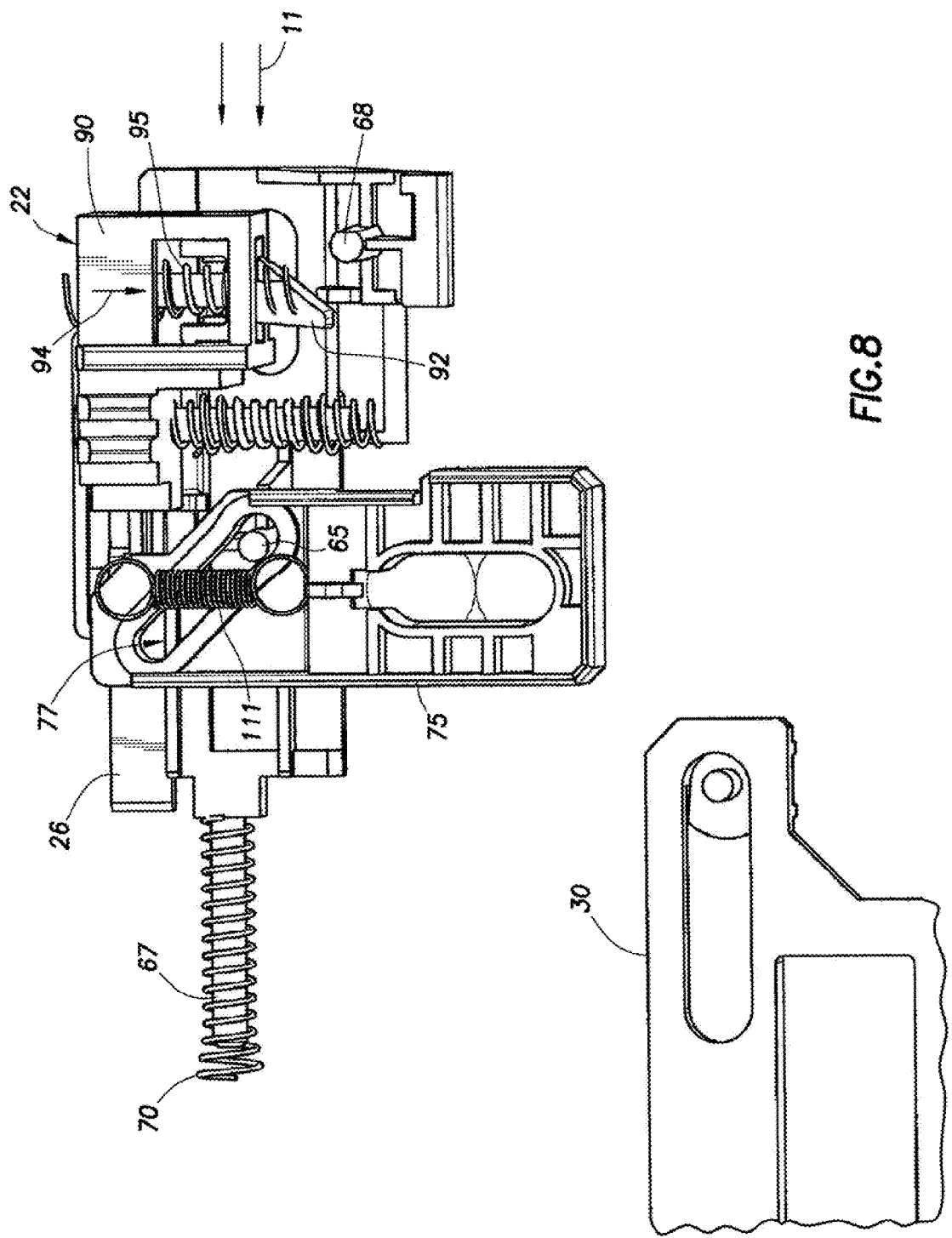

FIG. 8 illustrates a bottom view of sliding member 20, ejector bar 30, locking bracket 75 and stop member 90. The stop member 90 comprises an angled stop surface 92 and a spring 95. The angled stop surface 92 may be of a substantially triangular shape or of a quadrilateral shape with all but one side parallel and/or perpendicular to the other sides. The size of the angled stop surface 92 ranges between 15 sq. mm and 45 sq. mm. The lock 23 (shown in FIG. 2) is inserted at slot 22. When inserted, the lock 23 causes the stop member 90 to slide in the direction of arrow 94. When the lock 23 is removed, spring 95 forces the stop member 90 in the direction opposite that of arrow 94. The placement of stop member 90 is in an unlocked position. The ejector bar 30 is free to move left and right as needed to lock and eject the notebook computer 10 to/from the docking station 12.

Figure 9:
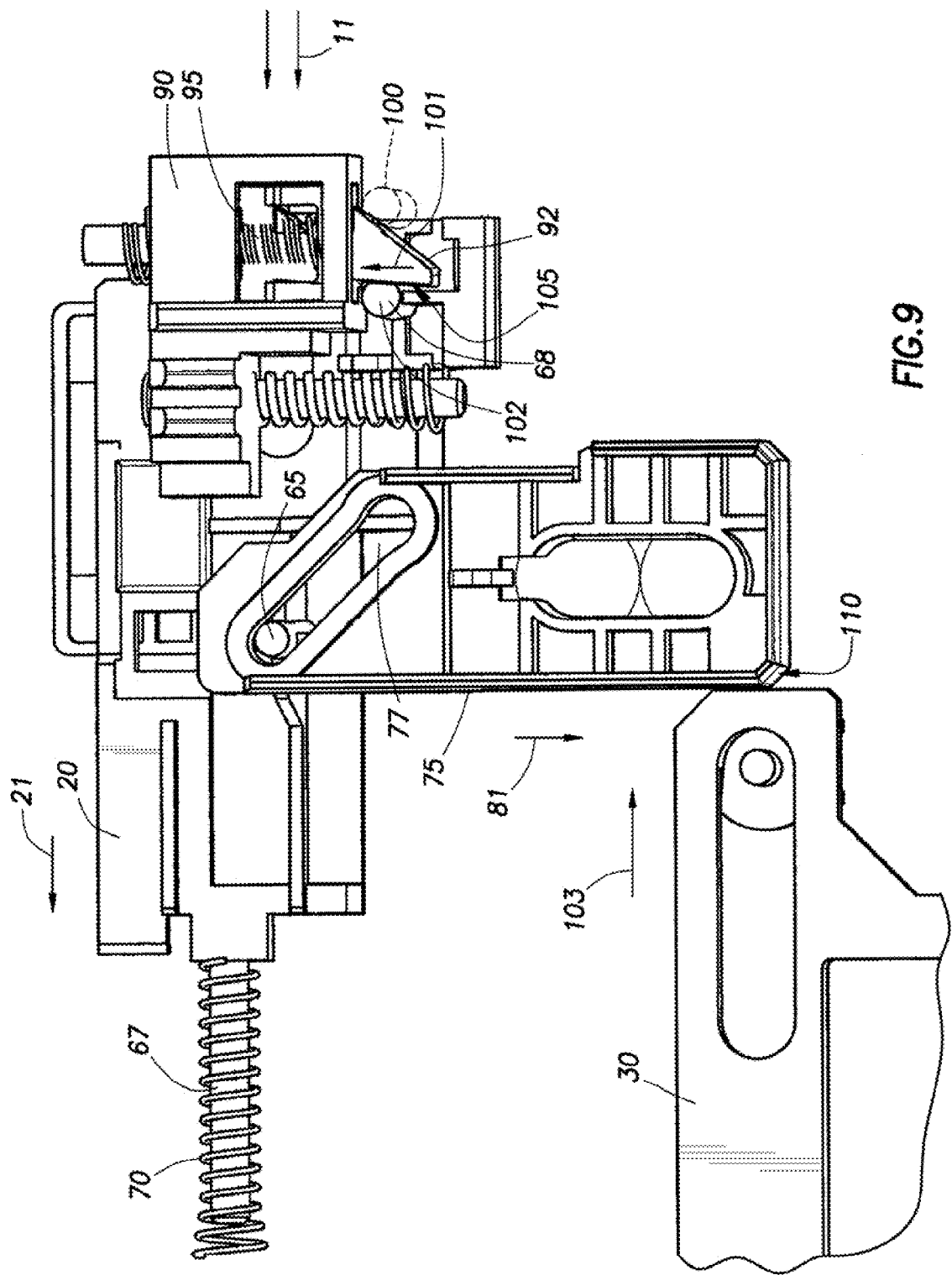
FIG. 9 illustrates the locking mechanism of FIGS. 7 and 8 in a locked position, in accordance with various embodiments.

FIG. 9 illustrates the stop member 90 in a locked position due to the action of lock 23 (shown in FIG. 2). Spring 95 is compressed. When the stop member 90 is pushed into the position shown in FIG. 9, the post 68 from the sliding member is at position 100. As the end-user slides the sliding member 20 (using, for example, a finger) in the direction of arrow 21, the post 68 moves from position 100 to position 102. In so moving from position 100 to position 102, the post 68 pushes against angled stop surface 92, which forces the stop surface 92 upward in the direction of arrow 101. This action further compresses spring 95. When the post 68 is pushed to position 102, the angled stop surface 92 is forced downward by the action of spring 95. The left edge 105 of angled stop surface 92 prevents the post 68 from returning back to position 100. The sliding member 20 is then locked in locking position L.

The action of forcing the sliding member 20 in the direction of arrow 21 causes locking bracket 75 to move downward in the direction of arrow 81, as explained above. Because the sliding member 20 becomes locked in locking position L, the locking bracket 75 also becomes locked in the position illustrated in FIG. 9. The bottom portion 110 of the locking bracket 75 thereby provides a locking surface that prevents the ejector bar 30 from moving to the right in the direction of arrow 103. Because the ejector bar 30 cannot move in the direction of arrow 103, the hooks 47 do not disengage and the plungers 50 are not pushed upward. Accordingly, the notebook computer 10 is locked in place on docking station 12 until the lock 23 is removed. Removal of lock 23 permits the various aforementioned pieces to return to their unlocked states, which then permits full use of the ejector bar 30. When the lock 23 is removed, spring 111 returns locking bracket 75 back to its unlocked position, as shown in FIG. 8.

The above discussion is meant to be illustrative of the principles and various embodiments of the present invention. Numerous variations and modifications will become apparent to those skilled in the art once the above disclosure is fully appreciated.

What is claimed is:

1. A docking station, comprising:
   a sliding member accessible to a user of the docking station and coupled to a post;
   a locking mechanism configured to couple to a lock and comprising a stop surface; and
   an apparatus capable of physically restraining an electronic device to the docking station;
   wherein, when the locking mechanism and the lock are locked together, and when the sliding member is adjusted from an unlocked status to a locked status, the stop surface is fixed in a locked state, the stop surface thereby fixing the post in a locked position, the post thereby fixing the sliding member in said locked status;
   wherein, when the sliding member is fixed in said locked status, the apparatus physically restrains the electronic device to the docking station.

2. The docking station of claim 1, wherein the sliding member is fixed in said locked status until the locking mechanism is unlocked from the lock.

3. The docking station of claim 1, wherein, when the sliding member is adjusted toward said locked status, the post pushes against the stop surface, thereby pushing the stop surface in a first direction, and when the sliding member is in the locked status, a spring in the locking mechanism pushes the stop surface in a second direction, thereby locking the post in the locked position.

4. The docking station of claim 1, wherein, when fixed in said locked position, the post keeps a locking bracket coupled to said post locked;
   wherein, when kept locked, the locking bracket prevents an ejector bar from ejecting the electronic device;
   wherein, when the ejector bar is prevented from ejecting the electronic device, the apparatus physically restrains the electronic device to the docking station.

5. The docking station of claim 4, wherein, when the sliding member is adjusted from the unlocked status to the locked status, a position of another post coupled to the sliding member is adjusted within an angled cam, thereby causing the locking bracket to be locked.

6. The docking station of claim 4, wherein the locking mechanism keeps said post locked using a spring-mounted, angled stop surface.

7. The docking station of claim 6, wherein the post is unlocked by adjusting said sliding member from the unlocked status to the locked status when the locking mechanism is locked to said lock.

8. The docking station of claim 1, wherein the docking station comprises a notebook computer docking station.

9. The docking station of claim 1, wherein, when the sliding member is in said locked status but said locking mechanism is not locked to said lock, an ejector bar is able to eject said electronic device from the docking station.

10. A system, comprising:
   a locking mechanism that couples to a first component;
   a sliding member accessible to a user of the system, the sliding member couples to a second component; and
   an apparatus that is able to physically restrain an electronic device to the system;
   wherein, when the sliding member is adjusted from an unlocked position to a locked position after coupling a lock to said locking mechanism, the first component keeps the second component in a locked status and the second component causes the apparatus to physically restrain the electronic device to the system;
   wherein the apparatus ceases to physically restrain the electronic device to the system only when the lock is uncoupled from the locking mechanism.

11. The system of claim 10, wherein the apparatus does not physically restrain the electronic device to the system if the sliding member is adjusted from the unlocked position to the locked position before coupling the lock to said locking mechanism.

12. The system of claim 10, wherein the system comprises a notebook computer docking station.

13. The system of claim 10, wherein the apparatus comprises a hook that couples to said electronic device, and wherein said electronic device comprises a notebook computer.

14. A system, comprising:
   means for positioning a component in a position;
   means for locking said component into said position;
   means for physically restraining an electronic device to said system when said component is locked into said first position;
   wherein the means for physically restraining restrains said electronic device to the system until the means for locking releases the component from said first position.

15. The system of claim 14, wherein the system comprises a computer docking station.

16. The system of claim 14, wherein, when locked to a lock, the means for locking remains in a locked state;
   wherein, when the means for locking is kept in the locked state, said component keeps a locking bracket coupled to said component in a locked position;
   wherein, when kept in a locked position, the locking bracket prevents ejection means from ejecting the electronic device;
   wherein, when the ejection means is prevented from ejecting the electronic device, the means for physically restraining physically restrains the electronic device to the system.

17. The system of claim 16, wherein, when the means for positioning is adjusted from an unlocked status to a locked status, a position of a second component coupled to the means for positioning is adjusted within an angled cam, thereby causing the locking bracket to be positioned in said locked position.

18. The system of claim 16, wherein the means for locking keeps said component in the position using a spring-mounted, angled stop surface.

19. The system of claim 18, wherein the component is moved to said position by adjusting said means for positioning from an unlocked status to a locked status when the means for locking is locked to said lock.

20. The system of claim 14, wherein, when the means for positioning is in a locked position but said means for locking is not locked to a lock, ejection means is able to eject said electronic device from the system.

* * * * *